United States Patent

[11] 3,592,089

| [72] | Inventor | Frank C. Skrentner |
| | | Bloomfield Hills, Mich. |
| [21] | Appl. No. | 833,349 |
| [22] | Filed | June 16, 1969 |
| [45] | Patented | July 13, 1971 |
| [73] | Assignee | La Salle Machine Tool Inc. |
| | | Warren, Mich. |

[54] APPARATUS FOR MACHINING SPACED SURFACES
5 Claims, 6 Drawing Figs.

[52] U.S. Cl. .................................................. 82/25,
82/1, 82/2 A
[51] Int. Cl. .................................................. B23b 21/00
[50] Field of Search .......................................... 82/25, 24.1,
4.1, 2

[56] References Cited
UNITED STATES PATENTS
1,334,335  3/1920  Warren et al. ................. 82/25 X
2,734,255  2/1956  Tack ............................ 82/4.1 X
3,442,164  5/1969  Blazer .......................... 82/2

*Primary Examiner*—Leonidas Vlachos
*Attorney*—Olsen and Stephenson

ABSTRACT: A tool retracting head for finish machining parallel surfaces on a workpiece in which the tools which are movable across the surfaces to be machined are mounted on relatively movable supporting head sections. The tools are moved radially inwardly along opposite surfaces of a rotating workpiece, one of the head sections is then moved a predetermined distance in a direction to move the tool thereon away from the tool on the other head section, the workpiece is then moved in the same direction a smaller distance so that both surfaces are spaced from the tools, and the head is then retracted while the tools are spaced from the workpiece surfaces to positively preclude the formation of objectionable drawback lines on the workpiece.

INVENTOR
FRANK C. SKRENTNER

BY
Olsen and Stephenson
ATTORNEYS

INVENTOR
FRANK C. SKRENTNER
BY Olsen and Stephenson
ATTORNEYS

INVENTOR
FRANK C. SKRENTNER

APPARATUS FOR MACHINING SPACED SURFACES

This invention relates generally to apparatus for machining workpieces and more particularly to improved apparatus of this type capable of finish facing workpiece surfaces so as to eliminate the possibility of drawback lines thereon.

The machining apparatus of this invention is particularly adapted for finish facing parallel surfaces on disc brake rotors, and is particularly described herein with reference to this specific application, although it is to be understood that the method and apparatus of this invention is not limited to this single application. Patent application Ser. No. 792,100 filed Jan. 17, 1969 and assigned to the assignee of this application discloses an indexable turret head tool support in which a series of tools are sequentially usable, on indexing of the head, so that it is not necessary to shut down the automated line carrying parts to be machined each time a set of tools has become worn. The apparatus of this invention provides for relative movement of parts of the turret head which machine oppositely facing surfaces on the workpiece, thereby enabling spacing of the tools from the workpiece surfaces during retraction of the tools. More specifically, following machining of the workpiece surfaces, one of the head sections is moved a predetermined distance in a direction away from the surface which it has just completed machining. The workpiece is then moved in the same direction a distance less than this predetermined distance to thereby provide for all of the tools being spaced from the surfaces which they have just finished machining. The tools are then retracted, and because they are spaced from the machined surfaces, the possibility of the tools forming objectionable drawback lines on the machined surfaces is positively precluded. An air chamber is formed in the turret head so that when air is supplied thereto, the tool sections are moved to position the tools thereon for machining a workpiece. When the supply of air to the air chamber is discontinued, springs in the turret head are capable of moving one of the tool head sections the predetermined distance described above. An air passage system is also included in the turret head for signaling the position of the movable turret head section.

Further objects, features and advantages of this invention will become apparent from a consideration of the following description, the appended claims, and the accompanying drawing in which:

Figure 1:
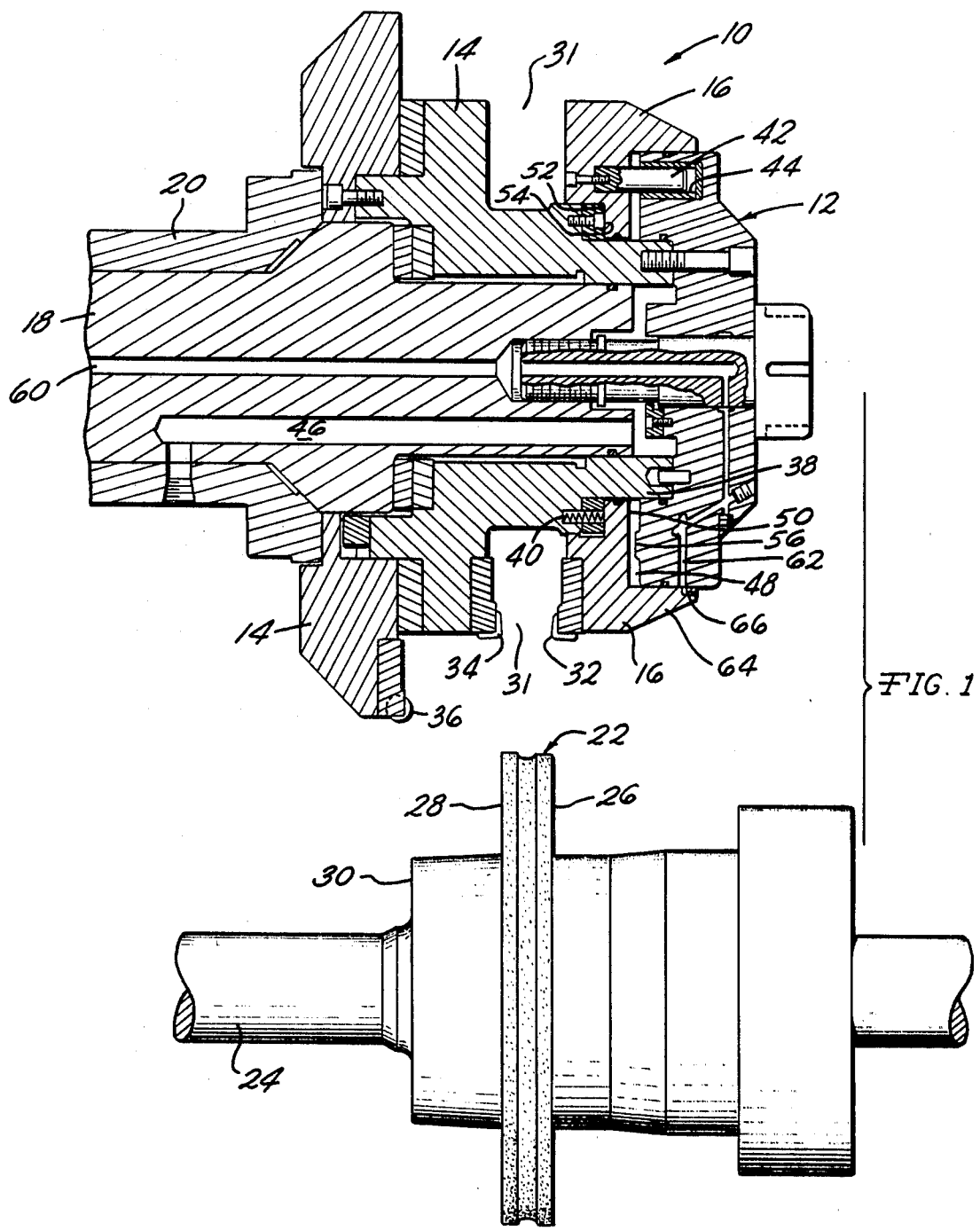
FIG. 1 is a fragmentary sectional view of the turret head of this invention, showing the turret head sections in position for machining a workpiece, and illustrating a workpiece in a position to be machined by tools on the turret head.

With reference to the drawing, the machining apparatus of this invention, indicated generally at 10, is illustrated in FIG. 1 as including a turret head 12 constructed generally like the turret head described in the aforementioned copending application except that the present turret head 12 includes what is termed herein a fixed section 14 and a movable section 16. During use of turret head 12, the fixed section 14 remains in a fixed position relative to a spindle 18 on which the head 12 is mounted and the movable section 16 is movable back and forth axially of the spindle 18. A body 20 supports the spindle 18 in a manner described in detail in the aforementioned copending application.

A plurality of workpieces 22, only one of which appears in FIG. 1, are mounted on fixturing and indexing apparatus 24, the details of which form no part of the present invention, which is capable of both rotating the workpiece 22 about its axis which is parallel to the axis of spindle 18 and of advancing the workpiece 22 in a direction parallel to the axis of spindle 18. In the illustrated embodiment of the invention, the workpiece 22 is a disc brake rotor having parallel surfaces 26, 28 and 30 which it is desired to finish face by use of the turret head 12. It should be noted that the surface 26 faces in one direction and the surfaces 28 and 30 face in an opposite direction.

Figure 2:
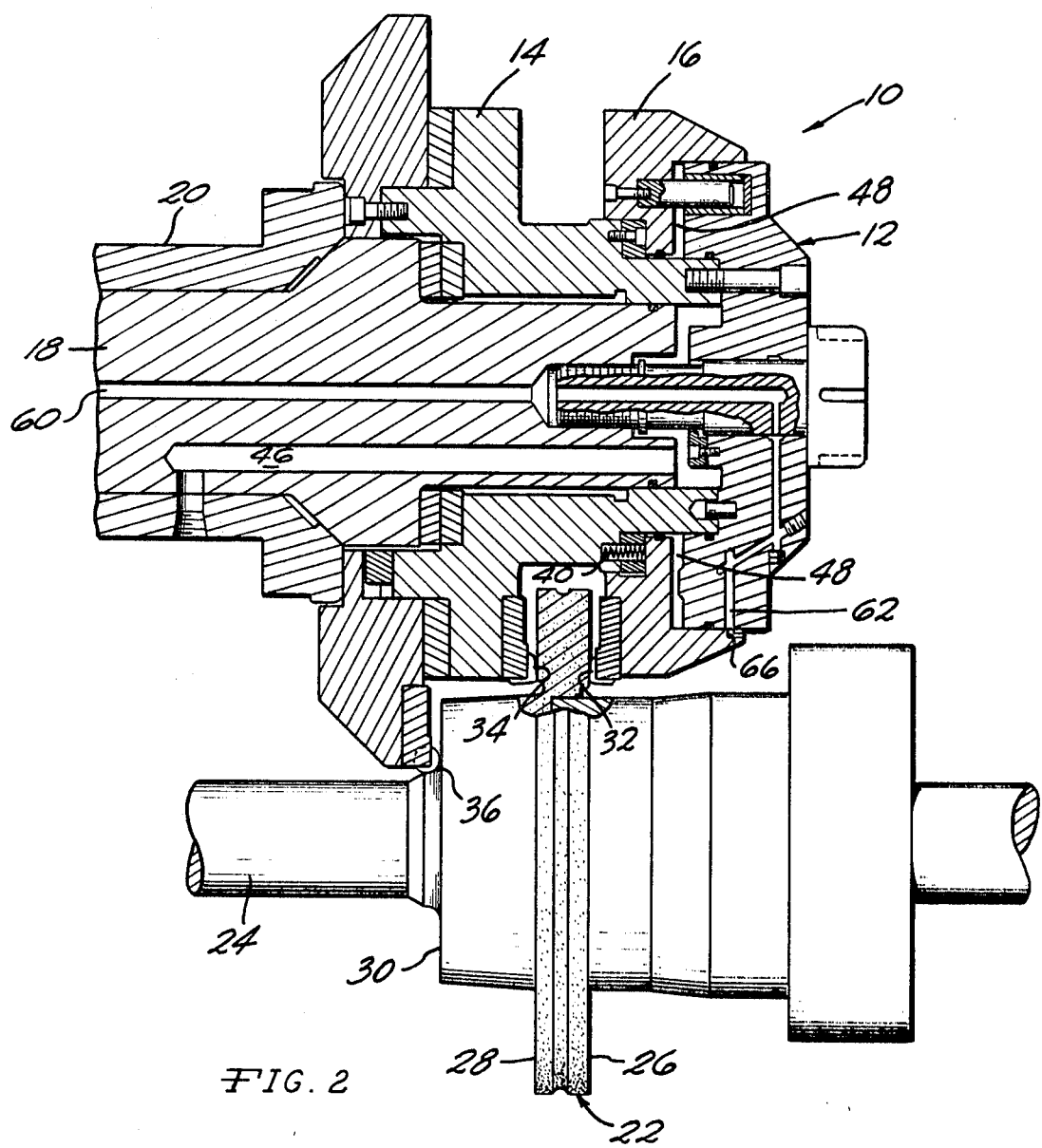
FIG. 2 is a sectional view like FIG. 1 showing the turret head and the workpiece in position following completion of the movement of the turret head to machine the workpiece.

The fixed turret head section 14 is generally cylindrical in shape having an annular gap or groove 31 intermediate its ends, and the movable section 16 is positioned generally within this groove 31. A plurality of cutting tools 32, only one of which is shown, are mounted on the turret section 16 so that the head 12 can be indexed through predetermined angular increments about the axis of the spindle 18 to successively move each of the tools 32 into operative position, as explained in detail in the aforementioned copending application. A similar set of cutting tools 34, only one of which is shown, are mounted on the turret head section 14 at positions aligned axially with the tools 32. A third set of tools 36 is mounted on the head section 14 in a predetermined spaced relation with the tools 34. In the position of the head section 16 illustrated in FIG. 1, the tools 32, 34 and 36 are spaced-apart distances corresponding to the desired spacing of the workpiece surfaces 26, 28 and 30. As a result, when the workpiece 22 is moved to the position shown in FIG. 1 in which the surfaces 26, 28 and 30 are substantially aligned with the tools 32, 34 and 36, respectively, the head 12 is movable toward the workpiece 22, which is being rotated at this time, to the position shown in FIG. 2 to finish face the surfaces 26, 28 and 30.

As shown in FIG. 1, the turret head section 16 is of annular shape and is supported at its radially inner side on a tubular portion 38 of the head section 14. A plurality of springs 40, mounted on the head section 14 and engaged with the head section 16 continually urge the head section 16 in a direction tending to move the tools 32 away from the tools 34 and 36. Guide pins 42, only one of which is shown, on the head section 16 extend into guide passages 44 formed in the head section 14 so as to guide the head section 16 during movement relative to the head section 14.

An air passage 46 in the spindle 18 communicates with an air chamber 48 in the head 12, one wall 50 of which is formed by the head section 16. On supply of air to the chamber 48, the head section 16, is urged against the pressure of the springs 40 in a direction to move the tools 32 toward the tools 34. Such movement is limited by engagement of a surface 52 on section 16 with a surface 54 on the head section 14. When the surfaces 52 and 54 engage, the tools 32 are in a precisely spaced relation relative to the tools 34 corresponding exactly to the desired spacing of the workpiece surfaces 26 and 28. When the supply of air to the chamber 48 is discontinued, and the passage 46 is connected to atmosphere, the total air pressure force on the section surface 50 quickly drops below the force of the springs 40 on the section 16, resulting in movement of the section 16 to a position in which the surface 50 engages projections 56 on the head section 14, the purpose of which is to prevent elimination of the chamber 48 when the head section 16 is moved to this position. In this position of the head section 16, the spacing between the tools 32 and 34 is increased, for a purpose to appear presently.

In the operation of the machining apparatus 10, assume that the head 12 is in the position illustrated in FIG. 1, the workpiece 22 is also in the position shown in FIG. 1, and it is desired to finish face the workpiece surfaces 26, 28, and 30. The workpiece 22 is rotated and the turret head 12 is moved toward the workpiece 22 so that the tools 32, 34 and 36 are moved radially inwardly on the workpiece surfaces 26,28 and 30 to the position shown in FIG. 2. When the head 12 has been moved to the position shown in FIG. 2, the faces 26, 28 and 30 have been finish machined and it is necessary to return the head 12 to the position shown in FIG. 1 for a subsequent machining operation without creating drawback lines on the surfaces 26, 28 and 30 by retracting the tools 32, 34 and 36 along these surfaces.

Figure 3:
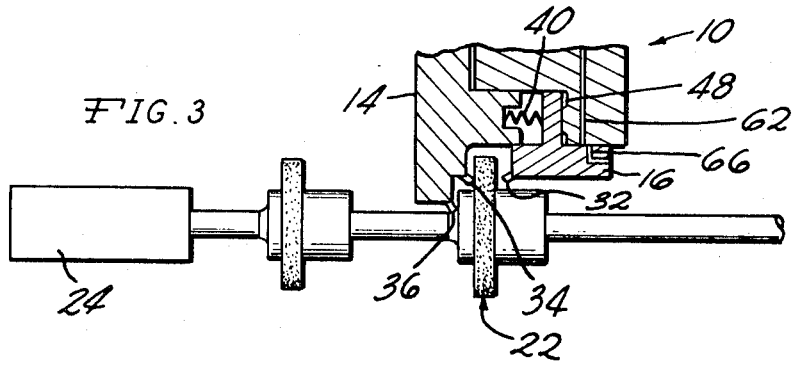
FIGS. 3, 4, 5 and 6 are diagrammatic views illustrating the steps in the method of this invention which follow movement of the turret head to the position shown in FIG. 2.
Figure 4:
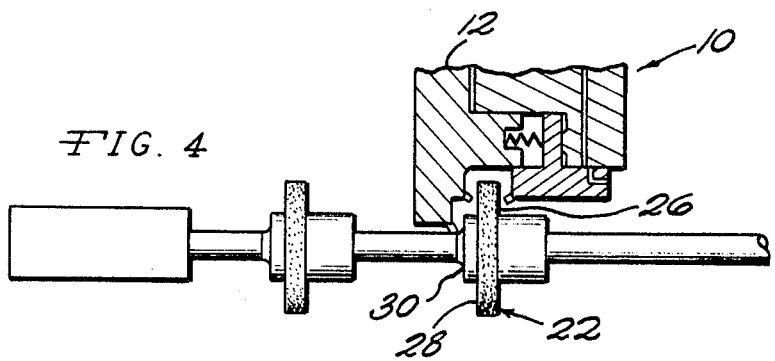
Figure 5:
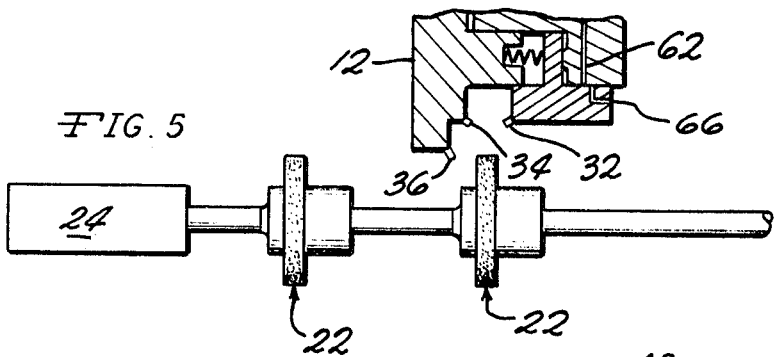
Figure 6:
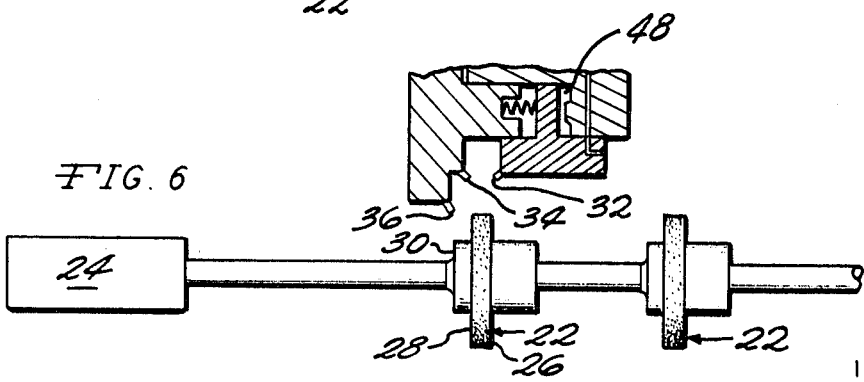

In the apparatus of this invention, this objective is accomplished by first connecting the air passage 46 to atmosphere so as to exhaust air from the chamber 48. This allows the springs 40 to move the head section 16 in a direction to move the tools 32 a predetermined distance away from the tools 34, as shown in FIG. 3. The workpiece rotating and indexing mechanism 24 is then operated to move the workpiece 22 in a direction toward the tools 32 a distance less then the distance the tools 32 have just been moved away from the tools 34 to thereby place the workpiece 22 in a position shown in FIG. 4. As shown in FIG. 4, the workpiece surfaces 26, 28 and 30 which have just been finish faced are now space from the tools 32, 34 and 36, so that the head 12 can be moved to the retracted position shown in FIG. 5. Air under pressure is then resupplied to the passage 46 so that the air under pressure in the chamber 48 will move the head section 16 in a direction to compress the springs 40 and move the tools 32 into the predetermined spaced relation with the tools 34 illustrated in FIG. 1 and in FIG. 6. The apparatus 24 is then operated to move the workpiece 22 which has just had the surfaces 26, 28 and 30 finish faced out of an aligned position with the head 12 and move the next successive workpiece 22 to the position illustrated in FIG. 6 in which the surfaces 26, 28 and 30 thereon are substantially aligned with the tools 32, 34 and 36. The above-described cycle is then repeated to provide for finish facing of the surfaces 32, 34 and 36 on the workpiece 22 which is aligned with the head 12 to provide for the finish facing of these surfaces.

A second air passage 60 in the spindle 18 communicates continually with a passage 62 in the fixed head section 14. A flange 64 on movable head section 16 has a through passage 66 formed therein which lines up with the passage 62 when the tools 32 are in a machining position (FIG. 1) However, when the head section 16 has been moved to the inoperative position (FIG. 3) the passage 66 is out of alignment with passage 62 so that passage 62 is blocked by flange 64 causing back pressure in passage 60. This back pressure is useful in connection with conventional pressure responsive valve and switch apparatus to signal the position of head section 16 during automatic operation of head 12.

From the above description it is seen that this invention provides a method and apparatus for finish facing parallel surfaces on a workpiece without any possibility of forming undesirable drawback lines on the surfaces. This enables inclusion of the head 12 in automated machinery capable of rapidly finish facing surfaces such as the ones illustrated at 26, 28 and 30 on the illustrated disc brake rotor 22.

What I claim is:

1. In machining apparatus which includes a movable tool carrying head having spaced-apart tools adapted to machine spaced surfaces on a workpiece, said head comprising a pair of sections one of which has one of said tools mounted in a fixed position thereon, the other one of said sections having another one of said tools mounted in a fixed position thereon, means on said sections guidably supporting the other one of said sections on said one section so that the tool mounted on said other one of said section is is movable toward and away from the tool on said one section, and means on said head forming a fluid chamber on one side of said other one of said sections so that on supply of fluid thereto said other one of said sections is moved relative to said one section.

2. Machining apparatus according to claim 1 further including means positioned between said sections urging said other one of said section in one direction relative to said one section.

3. Machining apparatus according to claim 2 wherein said urging means consists of a plurality of springs.

4. Machining apparatus according to claim 1 further including means in said one section providing an air passage, and passage means in said other one of said sections movable between aligned and nonaligned positions relative to said passage in said one section for remotely indicating the position of said other one of said sections relative to said one section.

5. Apparatus for machining spaced parallel surfaces on a disc brake rotor being rotated about the axis thereof without leaving drawback lines on the surfaces, said apparatus comprising a tool carrying head consisting of a fixed section having an axis parallel to said rotor axis and a movable section mounted on said fixed section for movement longitudinally of said fixed section axis, cutting tools on said sections extending generally toward each other, springs on said fixed section engaged with said movable section and urging said movable section in a direction to move a tool thereon away from a tool on said fixed section, means in said head forming an air chamber communicating with one side of said movable section so that on supply of air to said chamber said movable section is moved in the opposite direction to a position in which said tools are in a predetermined spaced relation corresponding to the spacing between said disc brake surfaces and are in alignment with said surfaces.